(12) United States Patent
Chao et al.

(10) Patent No.: US 10,567,970 B2
(45) Date of Patent: Feb. 18, 2020

(54) CLOUD RADIO ACCESS NETWORK SYSTEM AND CONTROL METHOD THEREOF

(71) Applicant: Alpha Networks Inc., Hsinchu (TW)

(72) Inventors: Chih-Wei Chao, Hsinchu (TW); Li-Chung Hsu, Hsinchu (TW); Yu-Hsin Kuo, Hsinchu (TW); Po-Wei Shih, Hsinchu (TW); Shih-Chi Lee, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 16/217,248

(22) Filed: Dec. 12, 2018

(65) Prior Publication Data

US 2020/0029220 A1 Jan. 23, 2020

(30) Foreign Application Priority Data

Jul. 17, 2018 (TW) .............................. 107124619 A (51) Int. Cl.
*H04W 16/10* (2009.01)
(52) U.S. Cl.
CPC ................................. *H04W 16/10* (2013.01)
(58) Field of Classification Search
CPC .................................................... H04W 16/10
See application file for complete search history.

(56) References Cited

U.S. PATENT DOCUMENTS 9,730,135 B1 * 8/2017 Rahman ................ H04W 64/00
2012/0155446 A1 6/2012 Machida
(Continued)

FOREIGN PATENT DOCUMENTS

| CN | 105897611 | 8/2016 |
|---|---|---|
| CN | 106875651 | 6/2017 |

(Continued)

OTHER PUBLICATIONS

Wei-Cheng Wang, Ping-Chun Huang., "SDN-Based BGP Implementation", ICT Journal, No. 167, 46-53 pages. Oct. 4, 2016. https://ictjournal.itri.org.tw/WebTools/FilesDownload.ashx?Siteid=654246032665636316&MmmID=65430443206 1644411&fd=Messagess_NFiles&RD=2&Pname=5_20161004104439.pdf&MSID=1.

(Continued)

*Primary Examiner* — Duc C Ho
(74) *Attorney, Agent, or Firm* — WPAT, PC (57) ABSTRACT

A cloud radio access network system includes remote signal sources, a baseband processing unit pool, an access management server, a software defined network controller and a network signal forwarder. The software defined network controller is electrically connected to the access management server and the network signal forwarder. The network signal forwarder includes at least two network connectors, each of which is configured to be connected to one remote signal source or the baseband processing unit pool. The software defined network controller obtains connection relation between the network connectors and the remote signal sources or the baseband processing unit pool, and provides network resource information to the network signal forwarder according to the connection relation. The network signal forwarder establishes communication between one remote signal source and the baseband processing unit pool according to the network resource information.

14 Claims, 4 Drawing Sheets

(56) References Cited

U.S. PATENT DOCUMENTS

| | | | |
|---|---|---|---|
| 2015/0063802 A1 | 3/2015 | Bahadur et al. | |
| 2015/0215231 A1* | 7/2015 | Liu | H04L 45/28 709/213 |
| 2016/0249353 A1 | 8/2016 | Nakata | |
| 2018/0063847 A1* | 3/2018 | Huang | H04W 28/16 |
| 2018/0317121 A1 | 11/2018 | Liao | |
| 2018/0376338 A1* | 12/2018 | Ashrafi | H04L 67/10 |
| 2019/0199467 A1* | 6/2019 | Vu | H04L 1/0003 |

FOREIGN PATENT DOCUMENTS

| | | |
|---|---|---|
| CN | 106992838 | 7/2017 |
| TW | 201724885 | 7/2017 |

OTHER PUBLICATIONS

Taiwan Patent Office, "Office action", dated Jul. 19, 2019.
Chenchen Yang et al., "When ICN Meets C-RAN for HetNets: An SDN Approach", IEEE Communications Magazine ( vol. 53 , Issue: 11 , Nov. 2015 ), Nov. 9, 2015. https://ieeexplore.ieee.org/document/7321980.
Taiwan Patent Office, "Office action", dated Jan. 25, 2019.

* cited by examiner

CLOUD RADIO ACCESS NETWORK SYSTEM AND CONTROL METHOD THEREOF

FIELD OF THE INVENTION

The present disclosure relates to a cloud radio access network system and a control method of the system, and particularly to a cloud radio access network system using a software defined network controller and a control method of the system.

BACKGROUND OF THE INVENTION

A cloud radio access network (Cloud RAN) is a network which connects many distributed remote radio heads (RRH) to base stations of high density with only baseband function. The network load balancing is achieved by resource sharing. The cloud radio access network is an important development direction of next-generation networking. Recently, great research efforts are put on the system architecture and the control method for the cloud radio access network.

SUMMARY OF THE INVENTION

An aspect of the present disclosure provides a cloud radio access network (Cloud RAN) system. It includes a plurality of remote signal sources, a baseband processing unit pool, an access management server, a software defined network (SDN) controller and at least one network signal forwarder. Each remote signal source is configured to transmit an access signal. The baseband processing unit pool provides a baseband processing signal. The access management server provides an access state signal according to a request signal. The SDN controller is electrically connected to the access management server and the at least one network signal forwarder and configured to control the at least one network signal forwarder. The at least one network signal forwarder has at least two network connectors, each of which is configured to be connected to one of the baseband processing unit pool and the remote signal source. The SDN controller obtains connection relation between the at least two network connectors and the remote signal sources or the baseband processing unit pool, and generates and transmits network resource information to the at least one network signal forwarder according to the obtained connection relation. The at least one network signal forwarder establishes communication between one remote signal source and the baseband processing unit pool according to the network resource information.

Another aspect of the present disclosure provides a Cloud RAN system. It includes a plurality of remote signal sources, a baseband processing unit pool, an access management server, a SDN controller and at least one network signal forwarder. Each remote signal source is configured to transmit an access signal. The baseband processing unit pool provides a baseband processing signal. The access management server provides an access state signal. The SDN controller is electrically connected to the access management server and the at least one network signal forwarder. The remote signal sources and the baseband processing unit pool are electrically connected to the at least one network signal forwarder so that the access signal and the baseband processing signal are transmitted through the at least one network signal forwarder. Signal transmission between the SDN controller and the access management server are independent of the at least one network signal forwarder.

Another aspect of the present disclosure provides a Cloud RAN system. It includes a plurality of remote signal sources, a baseband processing unit pool, an access management server, a SDN controller and at least one network signal forwarder. Each remote signal source is configured to transmit an access signal. The baseband processing unit pool provides a baseband processing signal. The access management server provides an access state signal. The SDN controller is electrically connected to the access management server and the at least one network signal forwarder. The remote signal sources and the baseband processing unit pool are electrically connected to the at least one network signal forwarder. A plurality of different maximum transmission rates are transmitted via the access state signal. The maximum transmission rates includes at least a first maximum transmission rate and a second maximum transmission rate, and the first maximum transmission rate is lower than the second maximum transmission rate. When the baseband processing unit pool has authenticated one remote signal source, the baseband processing unit pool transmits an authentication notification signal to the access management server. Then, the access management server informs the SDN controller according to the authentication notification signal to make SDN controller to increase an upper limit of a signal transmission rate between the baseband processing unit pool and the authenticated remote signal source from the first maximum transmission rate to the second maximum transmission rate.

Another aspect of the present disclosure provides a control of the Cloud RAN system. The control method includes the following steps. The at least one network signal forwarder receives an access signal from one remote signal source. The at least one network signal forwarder determines whether the access signal matches data in network resource information. When the access signal does not match the data in the network resource information, the at least one network signal forwarder transmits the access signal to the SDN controller; the SDN controller converts the access signal into a request signal and transmits the request signal to the access management server; the access management server transmits an access state signal to the SDN controller according to the request signal; and the SDN controller determines whether to update the network resource information stored in the at least one network signal forwarder according to the access state signal. When the access signal matches data in the network resource information, the at least one network signal forwarder establishes communication between the baseband processing unit pool and the remote signal source which transmits the access signal according to the network resource information.

Another aspect of the present disclosure provides a control of the Cloud RAN system. The control method includes the following steps. The at least one network signal forwarder determines whether an access signal from one of the remote signal sources conforms to a predetermined rule. When the access signal conforms to the predetermined rule, the at least one network signal forwarder generates a first notification signal corresponding to the access signal and transmits the first notification signal to the SDN controller, and the SDN controller generates a request signal according to the first notification signal and transmits the request signal to the access management server. Signal transmission between the SDN controller and the access management server is independent of the at least one network signal forwarder.

Another aspect of the present disclosure provides a control method of the Cloud RAN system. The control method includes the following steps. The access management server transmits an access state signal to the SDN controller wherein the access state signal contains a plurality of different maximum transmission rates includes at least a first maximum transmission rate and a second maximum transmission rate, and the first maximum transmission rate is lower than the second maximum transmission rate. The baseband processing unit pool performs authentication of one remote signal source at the first maximum transmission rate. After the baseband processing unit pool authenticates the remote signal source, the baseband processing unit pool transmits an authentication notification signal to the access management server. The access management server informs the SDN controller according to the authentication notification signal to make the SDN controller to increase an upper limit of a signal transmission rate between the baseband processing unit pool and the authenticated remote signal source from the first maximum transmission rate to the second maximum transmission rate.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the description, "electrically connect", "communicate" and "communication" mean that an electrical signal path is provided for signal transmission. For example, if a first device is electrically connected to/communicated with a second device, it means that the first device can transmit/receive electrical signals to/from the second device via any known way such as wire, cable or wireless transmission in a direct or an indirect manner.

Figure 1:
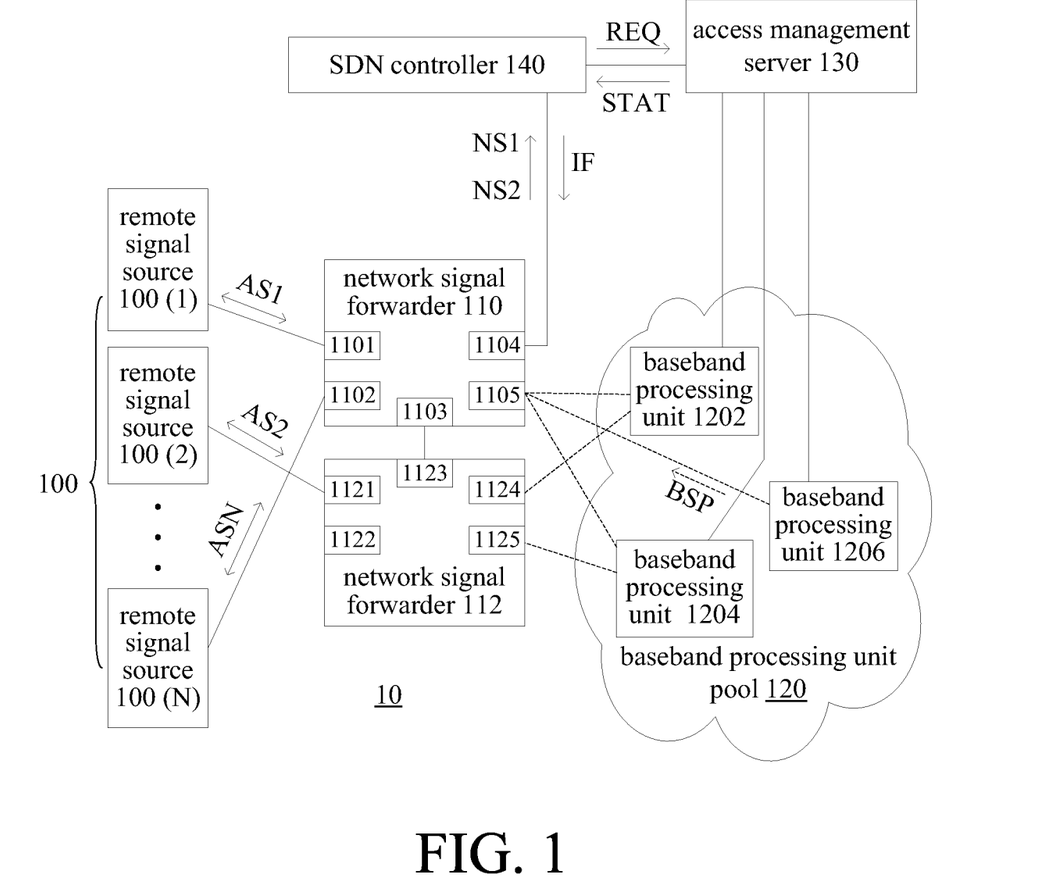
FIG. 1 is a schematic diagram illustrating an architecture of a Cloud RAN system according to an embodiment of the present disclosure.

Please refer to FIG. 1, a schematic diagram illustrating a cloud radio access network (Cloud RAN) system according to an embodiment of the present disclosure. In the embodiment, the Cloud RAN system 10 includes a remote signal source set 100, two network signal forwarders 110, 112, a baseband processing unit pool 120, an access management server 130 and a software defined network controller (SDN controller) 140. The remote signal source set 100 includes at least one remote signal source, e.g. remote signal sources 100(1), 100(2), ..., 100(N) in FIG. 1. The baseband processing unit pool 120 includes at least one baseband processing unit, e.g. baseband processing units 1202, 1204, ..., 1206 in FIG. 1. Although the quantities of the remote signal sources, the network signal forwarders and the baseband processing units are specified in this embodiment and shown in FIG. 1, the quantities of these devices are not limited as those described in the embodiment and can be adjusted or arranged as desired without departing from the present invention.

In the embodiment, each remote signal source 100(1), 100(2), ..., 100(N) may be an independent remote radio head (RRH), and its operation is not affected by any other RRH. The remote signal sources 100(1), 100(2), ..., 100(N) can transmit and/or receive corresponding access signals AS1, AS2, ..., ASN during activation and operation. In other words, each remote signal source can convert information into an access signal in a specific access signal format which is then sent to other devices of the Cloud RAN system 10 for further processing, or receive an access signal complying with a specific access signal format from other devices of the Cloud RAN system 10 to acquire information needed for individual operation. Each network signal forwarder 110, 112 forwards network signals based on specific rules. Each baseband processing unit 1202, 1204, 1206 is provided for performing specific function. Any known device which can work as required in the description is suitable for serving as the above described devices of the Cloud RAN system 10. For example, a smart phone or a notebook computer may serve as the remote signal source; a network switch or a network router may serve as the network signal forwarder; or a notebook computer, a server or a personal computer may serve as the baseband processing unit.

As shown in FIG. 1, the remote signal sources 100(1), 100(2), ..., 100(N) are in communication with the network signal forwarders 110, 112 via the access signals AS1, AS2, ..., ASN. Specially, the remote signal source 100(1) is electrically connected to the network connector 1101 of the network signal forwarder 110, and communicated with the network connector 1101 via the access signal AS1; the remote signal source 100(2) is electrically connected to the network connector 1121 of the network signal forwarder 112, and communicated with the network connector 1121 via the access signal AS2; and the remote signal source 100(N) is electrically connected to the network connector 1102 of the network signal forwarder 110, and communicated with the network connector 1102 via the access signal ASN.

The network signal forwarder 110 has network connectors 1101~1105 and the network signal forwarder 112 has network connectors 1121~1125 for data transmission. As shown in FIG. 1, in addition to the network connectors electrically connected to the remote signal sources 100(1), 100(2), ..., 100(N), the network signal forwarders 110, 112 have other network connectors to be electrically connected to other devices. For example, the network connector 1103 of the network signal forwarder 110 is electrically connected to the network connector 1123 of the network signal forwarder 112; the network connector 1104 of the network signal forwarder 110 is electrically connected to the SDN controller 140; the network connector 1105 of the network signal forwarder 110 is electrically connected to the baseband processing units 1202, 1204, 1206 in the baseband processing unit pool 120; the network connector 1124 of the network signal forwarder 112 is electrically connected to the baseband processing unit 1202 in the baseband processing unit pool 120; and the network connector 1125 of the network signal forwarder 112 is electrically connected to the baseband processing unit 1204 in the baseband processing unit pool 120. It is to be noted that each network connector may be electrically connected to the remote signal source, the baseband processing unit pool or the SDN controller selectively to meet specific requirement, and real connections among devices are not limited to this embodiment.

As shown in FIG. 1, the access management server 130 is electrically connected to the baseband processing unit pool 120 and the SDN controller 140. Specially, the access management server 130 is electrically connected to the baseband processing units 1202, 1204, 1206, directly or indirectly. For example, the access management server 130 is electrically connected to each of the baseband processing units 1202, 1204, 1206; or the access management server 130 is electrically connected to at least one baseband processing unit in the baseband processing unit pool 120, and the at least one baseband processing unit is further electrically connected to other baseband processing units.

The operation of the Cloud RAN system 10 is described as follows with reference to both FIG. 1 and FIG. 2, a flowchart illustrating a control method of the Cloud RAN system according to an embodiment of the present disclosure.

Once the Cloud RAN system 10 starts operation, the SDN controller 140, the remote signal sources 100(1)~100(N) and the baseband processing unit pool 120 start to be integrated under the architecture of the present Cloud RAN system 10. Taking the remote signal source 100(2) as an example, in the Cloud RAN system 10, when the remote signal source 100(2) is activated and connection is required, the remote signal source 100(2) transmits the access signal AS2 to the network signal forwarder 112 through the network connector 1121 (step S200). After receiving the access signal AS2, the network signal forwarder 112 compares specific information contained in the access signal AS2 with network resource information stored in the network signal forwarder 112 (step S202), and then determines whether to forward the received access signal AS2 according to a comparing result of the comparing step (step S204).

The specific information contained in the access signal AS2 may include at least one of an Internet Protocol address (IP address) of the remote signal source 100(2), a media access control address (MAC address) of the remote signal source 100(2) and a service type of the remote signal source 100(2). The network resource information is broadly defined as any information related to the corresponding relation or connection relation between devices in the Cloud RAN system 10. For example, the network resource information to be compared with the specific information contained in the access signal AS2 may include at least one of IP addresses of permitted remote signal sources, MAC addresses of permitted remote signal sources, service types of permitted remote signal sources, input network connectors of network signal forwarders for access signals transmitted from permitted remote signal sources, and output network connectors of network signal forwarders for access signals transmitted from permitted remote signal sources.

If the specific information contained in the access signal AS2 matches data in the network resource information, it is determined to forward the access signal AS2 (steps S202 and S204). For example, the comparing result indicates that the IP address, the MAC address and the service type of the remote signal source 100(2) are recorded in the network resource information, and the access signal AS2 from the remote signal source 100(2) selects the network connector 1121 of the network signal forwarder 112 as the input network connector. Then, it is determined that direct forwarding of the access signal AS2, which specifies the service type recorded in the network resource information, enters the network signal forwarder 112 through the network connector 1121, and carries the recorded IP address and MAC address of the remote signal source 100(2), is permitted. Entire or part of the permitted access signal AS2 (e.g. only the information regarding service request) is forwarded to the baseband processing unit pool 120 through another network connector to be processed by a corresponding baseband processing unit in the baseband processing unit pool 120 (step S206).

After the service request contained in the access signal AS2 is transmitted to the corresponding baseband processing unit, the baseband processing unit will process the service request and transmit a corresponding baseband processing signal BSP to the network signal forwarder (step S270). Upon receiving the baseband processing signal BSP, the network signal forwarder will determine whether the baseband processing signal BSP is recorded in the network resource information stored therein (step S272). For example, the baseband processing signal BSP recorded in the network resource information may include at least one of an IP address of a specific baseband processing unit, a MAC address of the specific baseband processing unit, a serial number of a network signal forwarder corresponding to the specific baseband processing unit and a serial number of a network connector corresponding to the specific baseband processing unit. In an embodiment, to determine whether the received baseband processing signal BSP is recorded in the network resource information in step S272, corresponding information contained in the baseband processing signal BSP (e.g. the IP address and the MAC address of the baseband processing unit transmitting the baseband processing signal BSP, the serial numbers of the network signal forwarder and the network connector receiving the baseband processing signal BSP) is compared with the network resource information. If the IP address of the baseband processing unit transmitting the baseband processing signal BSP and the serial number of the network connector receiving the baseband processing signal BSP match the same entry of data in the network resource information, the network signal forwarder determines that the received baseband processing signal BSP is recorded in the network resource information. Otherwise, the network signal forwarder determines that the received baseband processing signal BSP is not recorded in the network resource information. In other embodiments, to determine whether the received baseband processing signal BSP is recorded in the network resource information, the comparison may be made based on other corresponding information, and is not limited to this embodiment.

After step S272, if it is determined that the network resource information has recorded the received baseband processing signal BSP, step S274 directs the method to step S276. In step S276, the received baseband processing signal BSP is forwarded to the corresponding remote signal source (e.g. the original remote signal source transmitting the access signal at the start, i.e. the remote signal source 100(2) in this embodiment). Otherwise, if it is determined that the received baseband processing signal BSP is not recorded in the network resource information (conforming to a predetermined rule to transmit data to the SDN controller 140), step S274 directs the method to step S278. In step S278, the network signal forwarder generates a second notification signal NS2 according to the baseband processing signal BSP, and transmits the second notification signal NS2 to the SDN controller 140. Subsequently, the SDN controller 140 updates the network resource information according to the received second notification signal NS2 (step S280), and thus generates new network resource information (step S252). The network resource information is transmitted to the network signal forwarder via a control signal IF (step S254). It is to be noted that while activating the SDN controller 140 (step S250), the SDN controller 140 generally creates initial network resource information according to data previously stored therein (step S252). The initial network resource information may include predefined information or empty information without contents. Furthermore, the step of generating the new network resource information in step S252 and the step of transmitting the network resource information to the network signal forwarder in step S254 may be performed for only updated portions of the network resource information rather than generating and transmitting complete network resource information. The updated network resource information is stored in the network signal forwarder for use in later steps (e.g. step S202 or step S272).

In the above description, the steps subsequent to step S206 are performed when it is determined in step S202 that the forwarding of the access signal is permitted. In another embodiment, it is determined in step S202 that the forwarding of the access signal is not permitted, and the operation is described as follows.

Figure 2:
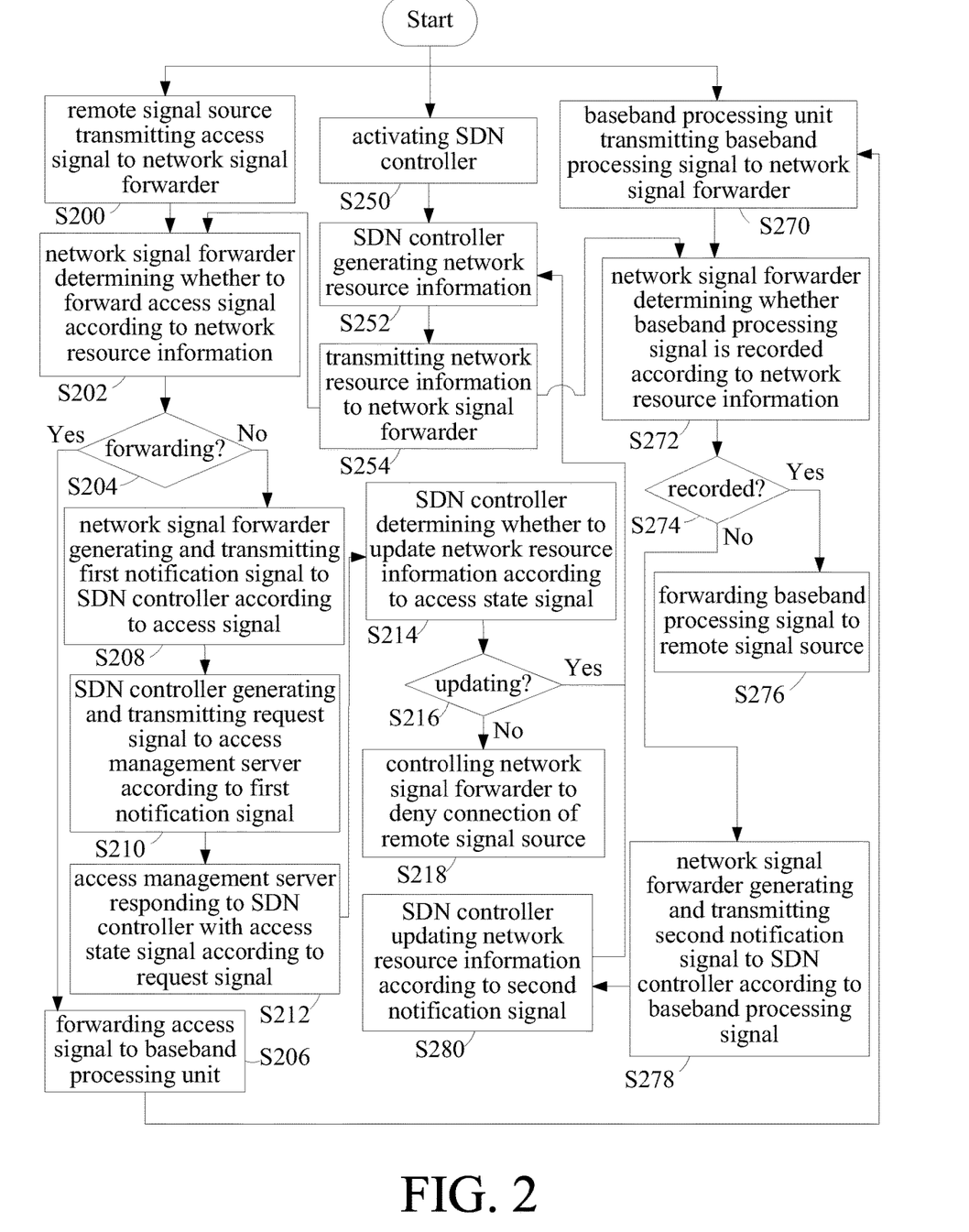
FIG. 2 is a flowchart illustrating a control method of the Cloud RAN system according to an embodiment of the present disclosure.

Please refer to both FIG. 1 and FIG. 2. If it is determined in step S202 that the forwarding of the access signal is not permitted, step S204 directs the method to step S208. In step S208, the network signal forwarder generates a first notification signal NS1 according to the received access signal, and transmits the first notification signal to the SDN controller 140. The SDN controller 140 generates a corresponding request signal REQ according to the first notification signal, and then transmits the request signal REQ to the access management server 130 (step S210). After receiving the request signal REQ from the SDN controller 140, the access management server 130 performs necessary operation (e.g. searching a corresponding database) according to the request signal REQ, generates an access state signal STAT corresponding to the request signal REQ according to the operation state, and respond to the SDN controller 140 with the access state signal STAT (step S212). After receiving the access state signal STAT from the access management server 130, the SDN controller 140 determines whether to update the network resource information according to the received access state signal STAT (step S214). If it is determined that the network resource information need not be updated (e.g. the access state signal STAT indicates that the access does not conform to the requirement), step S216 directs the method to step S218. In step S218, the network signal forwarder is controlled to deny the connection or access request from the remote signal source. Otherwise, if it is determined that the network resource information need be updated, step S216 directs the method to step S252. In step S252, the SDN controller 140 generates new network resource information, and then transmits the new network resource information to the network signal forwarder (step S254) for storage and use (e.g. for use in step S202 or step S272). Likewise, the step of generating the new network resource information in step S252 and the step of transmitting the network resource information to the network signal forwarder in step S254 may be performed for only updated portions of the network resource information rather than generating and transmitting complete network resource information.

The access signal AS2 outputted from the remote signal source 100(2) is taken for illustration. As described above, the access signal AS2 is transmitted to the network signal forwarder 112 through the network connector 1121 (step S200). If the specific information contained in the access signal AS2 does not match data in the network resource information stored in the network signal forwarder 112 (for example, the service type is not recorded in the network resource information), the network signal forwarder 112 determines that the forwarding of the access signal AS2 is not permitted (steps S202-S204). In this situation, the network signal forwarder 112 will generate a first notification signal NS1 correspondingly according to the specific information contained in the access signal AS2, especially the specific information which does not match data in the network resource information. The first notification signal NS1 is transmitted to the network signal forwarder 110 through the network connectors 1123 and 1103, and then transmitted to the SDN controller 140 through the network connector 1104 (step S208). In this embodiment, the first notification signal NS1 includes information indicating the receiving device (i.e. network signal forwarder 112 with network connector 1121) for the access signal AS2, information indicating the transmitting device (i.e. the remote signal source 100(2)) for the access signal AS2, information indicating the IP address of the remote signal source 100(2), information indicating the MAC address of the remote signal source 100(2), information indicating the service request from the remote signal source 100(2) and other information needed for later determination step. It is to be noted that the contents of the first notification signal NS1 are not limited to this embodiment, and may be adjusted or modified according to different environments without departing from the present disclosure.

After receiving the first notification signal NS1, the SDN controller 140 can determine whether the access signal AS2 is permitted to be transmitted to the baseband processing unit pool 120 according to the information contained in the first notification signal NS1. For this purpose, the SDN controller 140 converts part or entire of the information contained in the first notification signal NS1 into a request signal REQ suitable to be transmitted to the access management server 130 (step S210). In this embodiment, the request signal REQ includes information indicating the IP address of the remote signal source 100(2), information indicating the MAC address of the remote signal source 100(2) and information indicating the service request in the access signal AS2. It is to be noted that the contents of the request signal REQ are not limited to this embodiment, and may be adjusted or modified according to different environments without departing from the present disclosure.

After receiving the request signal REQ, the access management server 130 searches a back-end database (not shown) to determine whether the source of the access signal AS2 and the service request contained in the access signal AS2 conform to the requirement (e.g. depending on whether the requester is a valid registered user, whether the service request corresponds to the terminal service provided by the remote signal source 100(2), or whether the service request is within the service range of the Cloud RAN system 10). If the access management server 130 determines that the source of the access signal AS2 and the service request conform to the requirement, the access management server 130 can select one baseband processing unit in the baseband processing unit pool 120 and transmit the access signal AS2 to the selected baseband processing unit according to the data stored in the back-end database. Otherwise, the access management server 130 determines that the source of the access signal AS2 or the service request does not conform to the requirement (e.g. the service request is not within the service range of the Cloud RAN system 10), the access management server 130 deny the service request contained in the access signal AS2 via an access state signal STAT (step S212).

The communication and signal transmission between the access management server 130 and the back-end database can be performed according to any known technology, and redundant description about the operation is not given here.

It is to be noted that no matter whether the signal transmission conforming to the same or different signal specifications, while the access management server 130 responding to the SDN controller 140, the access state signal STAT permitting the service request contained in the access signal AS2 is different from the access state signal STAT denying the service request contained in the access signal AS2. To simplify the description, the term "access state signal STAT" is used in both conditions without giving respective signal names.

After receiving the access state signal STAT, the SDN controller 140 decides how to control the network signal forwarders 110, 112 according to the access state signal STAT (steps S214~S216). If the access state signal STAT indicates denial of the service request contained in the access signal AS2, the SDN controller 140 does not update the network resource information, and further transmits a control signal IF to control the network signal forwarder 112 to deny the connection of the remote signal source 110(2) (step S218). Otherwise, if the access state signal STAT indicates permission of the service request contained in the access signal AS2, the SDN controller 140 generates or updates the network resource information according to the access state signal STAT and the first notification signal NS1 previously received from the network signal forwarder 112 (step S252). Then, the SDN controller 140 outputs a control signal IF to transmit the network resource information to the network signal forwarder 112, and the network signal forwarder 112 stores the received network resource information (step S254). Thus, the network signal forwarder 112 can process the access signal AS2 based on the updated network resource information as described above (step S202).

It is to be noted that the network resource information generated by the SDN controller 140 need not be stored only in the network signal forwarder 112 which is designated to receive the access signal AS2. In fact, the network resource information generated by the SDN 140 controller can be stored in any network signal forwarder which is directly or indirectly controlled by the SDN controller 140. Alternatively, each entry of data in the network resource information generated by the SDN controller 140 is stored into respective network signal forwarders. For example, the baseband processing unit 1206 is designated to process the access signal AS2, and the baseband processing unit 1206 is electrically connected to the network connector 1105 of the network signal forwarder 110, but not the network signal forwarder 112. The data in the network resource information in connection with the access signal AS2 may be stored in both network signal forwarders 110, 112. Thus, the access signal AS2 can be transmitted from the network signal forwarder 112 to the baseband processing unit 1206 through the network signal forwarder 110 without repeating the steps of S200~S254 for the network signal forwarder 110.

The above description illustrates the operation about connecting a remote signal source to other devices of the Cloud RAN system 10 after the remote signal source is activated. It is to be noted that after the remote signal source is activated, if the state of the remote signal source changes (e.g. change in IP address due to moving the remote signal source, or change in service request from the remote signal source), the Cloud RAN system 10 can automatically and correspondingly adjust the network resource information according to the operation as described so as to achieve automatic setting the connection in the Cloud RAN system 10.

The Cloud RAN system 10 can be automatically set to respond to the activation or state change of a remote signal source according to the present disclosure. Furthermore, the Cloud RAN system 10 can be also automatically set to respond to activation or state change of a baseband processing unit according to the present disclosure. Please refer to both FIG. 1 and FIG. 2. When a baseband processing unit is activated, the baseband processing unit actively transmits a signal containing identifiable information to a corresponding network signal forwarder (step S270). In the specification, all the signals generated by the baseband processing units are collectively called baseband processing signals BSP, including the signals containing the identifiable information and the signals generated in response to the access signals. The baseband processing signal BSP may be designed according to any protocol as required. Such variation will not affect the concept of operation of the present system and method, and further description need not be given here.

After the network signal forwarder receives the baseband processing signal BSP, steps S272~S280 and steps S252~S254 are performed as described in the above embodiments. The SDN controller 140 generates the network resource information according to the baseband processing signal BSP containing the identifiable information of the baseband processing unit, and then transmits the network resource information to the network signal forwarder via the control signal IF for storage and later use. In an embodiment, the identifiable information of the baseband processing unit contained in the baseband processing signal BSP may include at least one of an IP address and a MAC address corresponding to the specific baseband processing unit.

Similarly, if the state of the baseband processing unit changes (e.g. a new baseband processing unit appears or the IP address of the baseband processing unit changes), the Cloud RAN system 10 can automatically and correspondingly adjust the network resource information stored in the network signal forwarder according to the operation as described so as to achieve automatic maintenance of the architecture of the Cloud RAN system 10.

According to the above-described technology, in response to the activation of the Cloud RAN system 10, the corresponding relations between the remote signal source(s) and the baseband processing unit pool (or baseband processing unit(s)) is automatically detected, created and recorded without manual operation. Once there appears a new or changed remote signal source or baseband processing unit in the Cloud RAN system 10, it can be recognized while it is requesting connection. The connection relation or corresponding relation of the new or changed device in the Cloud RAN system 10 is automatically established and stored so as to reduce manual operation.

It is to be noted that the signal transmission between the SDN controller 140 and the access management server 130 is independent of the network signal forwarders 110, 112 controlled by the SDN controller 140. In other words, the signal transmitted between the SDN controller 140 and the access management server 130 does not pass through any network signal forwarder (e.g. network signal forwarder 110, 112) controlled by the SDN controller 140. By this architecture, the access management server 130 can be hidden from the remote signal sources 100(1)~100(N) to prevent from network packet attack from the remote signal sources 100(1)~100(N) on the access management server 130.

Figure 3:
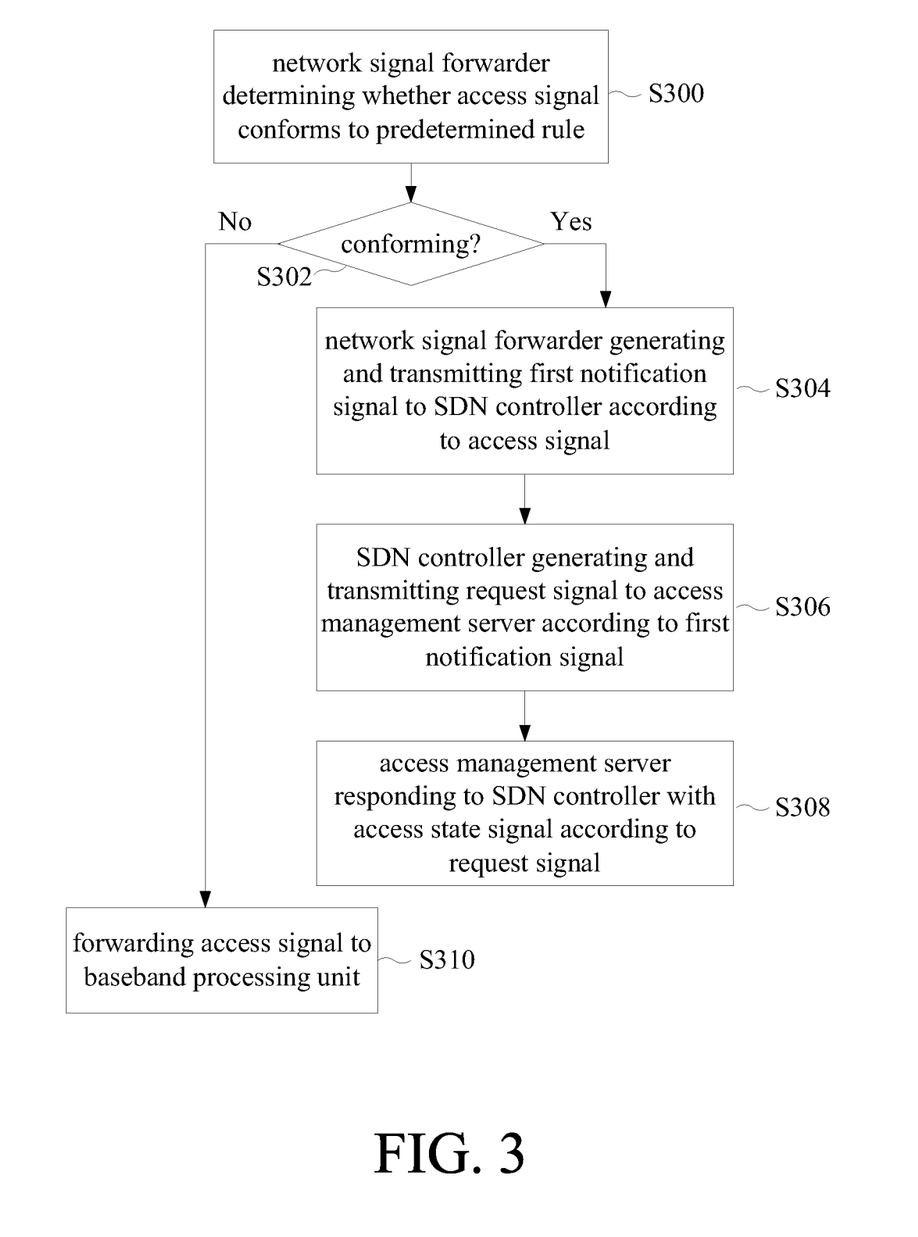
FIG. 3 is a flowchart illustrating a control method performed by the Cloud RAN system according to another embodiment of the present disclosure.

Please refer to both FIG. 1 and FIG. 3. FIG. 3 is a flowchart illustrating a control method wherein the signal transmission between the SDN controller and the access management server is independent of the network signal forwarder.

As shown in FIG. 3, after receiving the access signal, the network signal forwarder determines whether the access signal conforms to a predetermined rule (step S300). In this embodiment, the determination is made by judging whether the access signal matches data in the network resource information. If the access signal does not match data in the network resource information, it is determined that the access signal conforms to the predetermined rule. In other words, when the specific information contained in the access signal matches data in the network resource information, the access signal can be transmitted to the baseband processing unit pool 120 without confirmation from the SDN controller 140 and the access management server 130. Hence, this condition does not conform to the rule to transmit data to the SDN controller 140. Otherwise, if the specific information contained in the access signal does not match data in the network resource information, transmission of the access signal to the baseband processing unit pool 120 should be upon confirmation from the SDN controller 140 and the access management server 130. Hence, this condition conforms to the rule to transmit data to the SDN controller 140 and the access management server 130.

After the determination is made in step S300, step S302 directs the method to a corresponding step according to the determination result. If the access signal does not conform to the predetermined rule (i.e. no confirmation of forwarding the access signal is required), the method goes to step S310. In step S310, the access signal (the signal from the remote signal source) is forwarded to the corresponding baseband processing unit. Otherwise, if the access signal conforms to the predetermined rule (i.e. confirmation of forwarding the access signal is required), the access signal is not immediately forwarded to the access management server 130. The access signal should be processed in advance. Hence, the network signal forwarder generates a first notification signal NS1 according to the access signal, and then transmits the first notification signal NS1 to the SDN controller 140 (step S304). Subsequently, the SDN controller 140 generates a request signal REQ according to the first notification signal NS1, and then transmits the request signal REQ to the access management server 130 (step S306). Lastly, the access management server 130 responds with an access state signal STAT, following a reverse path of the request signal REQ, to the SDN controller 140 (step S308). The detailed operation is similar to steps S202~S212 in FIG. 2, and is not given here again.

According to the architecture and control method, it significantly reduces possibility of network packet attack on the access management server from remote signal sources. Furthermore, since the steps of the control method are similar to some steps in FIG. 2, it is easy to integrate the control method with other steps in the above embodiments to provide control methods with various modifications.

The access state signal STAT may convey values of multiple maximum transmission rates, at least including a first maximum transmission rate and a second maximum transmission rate wherein the first maximum transmission rate is lower than the second maximum transmission rate. After the baseband processing unit pool 120 has authenticated one of the remote signal sources 100(1)-100(N), the baseband processing unit pool 120 transmits an authentication notification signal to the access management server 130 to inform the access management server 130 that a service is about to start. The network packet flow rate required for authentication is usually lower than that for network service. Therefore, the access management server 130 informs the SDN controller 140 according to the authentication notification signal to make the SDN controller 140 to increase the upper limit of the transmission rate between the baseband processing unit pool 120 and the authenticated remote signal source from the first maximum transmission rate to the second maximum transmission rate.

Figure 4:
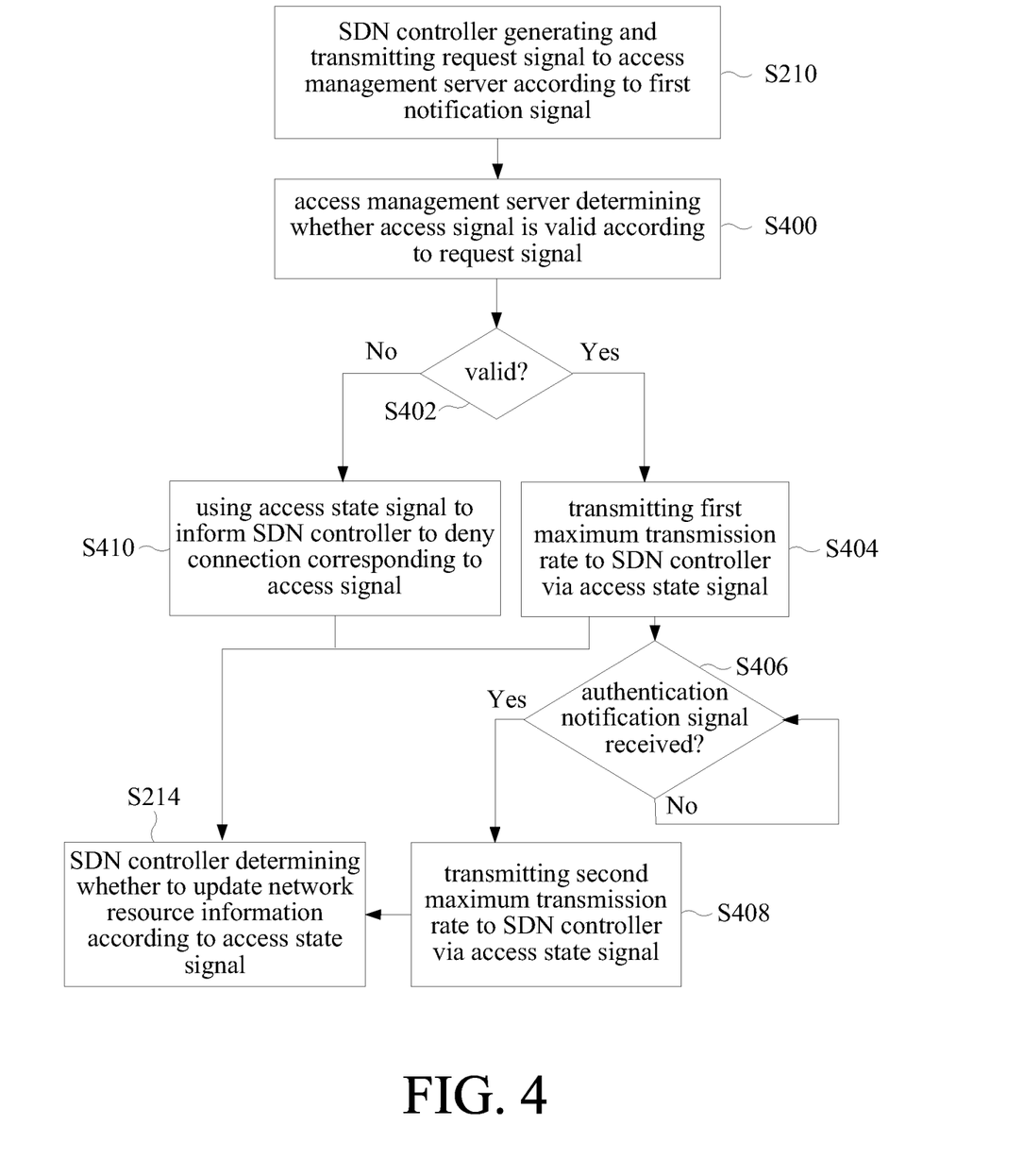
FIG. 4 is a flowchart illustrating a control method performed by the Cloud RAN system according to a further embodiment of the present disclosure.

Please refer to both FIG. 1 and FIG. 4 for illustration of this control method, wherein FIG. 4 is a flowchart illustrating a control method performed by the Cloud RAN system. Taking the remote signal source 100(2) and the access signal AS2 as an example again, after the SDN controller 140 generates the request signal REQ according to the first notification signal NS1 and transmits the request signal REQ to the access management server 130 (step S210 in FIG. 2 or FIG. 4), the access management server 130 determines whether the access signal AS2 is valid according to the request signal REQ (step S400). If the access signal AS2 is invalid, the method goes to step S410. Otherwise, if the access signal AS2 is valid, step S402 directs the method to step S404, and the access management server 130 transmits the first maximum transmission rate to the SDN controller 140 via the access state signal STAT. Upon receiving the access state signal STAT containing the first maximum transmission rate, while updating the network resource information (step S214), the SDN controller 140 limits the transmission rate between the remote signal source 100(2) and the baseband processing unit (e.g. baseband processing unit 1206) designated to process the access signal AS2 to be under the first maximum transmission rate.

After transmitting the first maximum transmission rate via the access state signal STAT (step S404), the access management server 130 will transmit second maximum transmission rate to the SDN controller 140 via the access state signal STAT (step S408) upon receiving the authentication notification signal (step S406). After receiving the access state signal STAT containing the second maximum transmission rate, the SDN controller 140 increases the upper limit of the transmission rate between the remote signal source 100(2) and the baseband processing unit designated to process the access signal AS2 from the first maximum transmission rate to the second maximum transmission rate.

In this embodiment, authentication is performed when the remote signal source 100(2) is initially connected to the baseband processing unit designated to process the access signal AS2. The authentication establishes preliminary communication between the remote signal source 100(2) and the baseband processing unit, designated to process the access signal AS2, to create proper communication mechanism and confirm service request. Successful authentication represents that the communication between the remote signal source 100(2) and the baseband processing unit designated to process the access signal AS2 has been well established, and execution of the service request from the remote signal source 100(2) can be started. Thus, after the authentication, the corresponding baseband processing unit or the baseband processing unit pool 120 can transmit the authentication notification signal to the access management server 130 to inform that the authentication has been finished successfully and service for the remote signal source starts.

In this embodiment, the limit of the transmission rate can be dynamically adjusted with different maximum transmission rates at different stages. Such adjustment can control and arrange the network bandwidth much effectively. Furthermore, the signal transmission between the access management server 130 and the baseband processing unit pool 120 is independent of the network signal forwarders 110, 112. In other words, the signal transmitted between the access management server 130 and the baseband processing unit pool 120 does not pass through any network signal forwarder 110, 112. By this architecture, the access management server 130 can be hidden from the remote signal sources 100(1)~100(N) to prevent from network packet attack on the access management server 130 from the remote signal sources 100(1)~100(N).

With the description of the above embodiments, the system architecture and control method of a Cloud RAN system are provided to reduce manual operation and achieve automatic connection between designated devices in the Cloud RAN system.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cloud radio access network system, comprising:
a plurality of remote signal sources, each of which is configured to transmit an access signal;
a baseband processing unit pool for providing a baseband processing signal;
an access management server for providing an access state signal according to a request signal; and
a software defined network controller, electrically connected to the access management server and at least one network signal forwarder, for controlling the at least one network signal forwarder, the at least one network signal forwarder having at least two network connectors, each of which is configured to be connected to one of the baseband processing unit pool and the remote signal source;
wherein the software defined network controller obtains connection relation between the at least two network connectors and the remote signal sources or the baseband processing unit pool, and generates and transmits network resource information to the at least one network signal forwarder according to the obtained connection relation, the at least one network signal forwarder establishing communication between one of the remote signal sources and the baseband processing unit pool according to the network resource information.

2. The cloud radio access network system according to claim 1, wherein when the access signal transmitted from the one remote signal source to the at least one network signal forwarder does not match data in the network resource information, the at least one network signal forwarder generates a first notification signal according to the access signal and transmits the first notification signal to the software defined network controller, and the software defined network controller converts the first notification signal into the request signal and transmits the request signal to the access management server.

3. The cloud radio access network system according to claim 2, wherein after the software defined network controller receives the access state signal generated according to the request signal from the access management server, the software defined network controller determines whether to update the network resource information according to the access state signal.

4. The cloud radio access network system according to claim 1, wherein when the baseband processing signal transmitted from the baseband processing unit pool to the at least one network signal forwarder does not match data in the network resource information, the at least one network signal forwarder generates a second notification signal according to the baseband processing signal and transmits the second notification signal to the software defined network controller, and the software defined network controller updates the network resource information according to the second notification signal.

5. The cloud radio access network system according to claim 1, wherein the cloud radio access network system comprises at least two network signal forwarders, and a first network connector of a first network signal forwarder is electrically connected to a second network connector of a second network signal forwarder.

6. The cloud radio access network system according to claim 1, wherein the baseband processing unit pool comprises a plurality of baseband processing units, each of which has an Internet Protocol address, the network resource information comprising the Internet Protocol address corresponding to each of the baseband processing units, a media access control address corresponding to each of the baseband processing units, a serial number of the at least one network signal forwarder corresponding to each of the baseband processing units and a serial number of each network connector corresponding to each of the baseband processing units.

7. A control method of a cloud radio access network system of claim 1, comprising steps of:
the at least one network signal forwarder receiving the access signal from the one remote signal source;
the at least one network signal forwarder determining whether the access signal matches data in the network resource information;
when the access signal does not match the data in the network resource information, the control method further comprising steps of:
the at least one network signal forwarder transmitting the access signal to the software defined network controller;
the software defined network controller converting the access signal into the request signal and transmitting the request signal to the access management server;
the access management server transmitting the access state signal to the software defined network controller according to the request signal; and
the software defined network controller determining whether to update the network resource information stored in the at least one network signal forwarder according to the access state signal; and
when the access signal matches data in the network resource information, the control method further comprising a step of:
the at least one network signal forwarder establishing communication between the baseband processing unit pool and the one remote signal source which transmits the access signal according to the network resource information.

8. The control method according to claim 7, wherein when the software defined network controller determines to update the network resource information stored in the at least one network signal forwarder according to the access state signal, the control method further comprises steps of:

updating the network resource information stored in the at least one network signal forwarder; and the at least one network signal forwarder establishing communication between the baseband processing unit pool and the one remote signal source which transmits the access signal according to the updated network resource information.

9. The control method according to claim 7, wherein when the software defined network controller determines not to update the network resource information stored in the at least one network signal forwarder according to the access state signal, the control method further comprises a step of:

controlling the at least one network signal forwarder to deny the one remote signal source which transmits the access signal.

10. The control method according to claim 7, wherein in the step that the access management server transmits the access state signal to the software defined network controller according to the request signal, the control method further comprises steps of:

determining a terminal service provided by the one remote signal source which transmits the access signal according to the request signal;

determining whether the terminal service is within a service range of the cloud radio access network system;

when the terminal service is within the service range of the cloud radio access network system, transmitting the access state signal to the software defined network controller to permit the software defined network controller updating the network resource information; and when the terminal service is not within the service range of the cloud radio access network system, transmitting the access state signal to the software defined network controller to deny the software defined network controller updating the network resource information.

11. The control method according to claim 10, wherein when the terminal service is within the service range of the cloud radio access network system, the control method further comprises a step of:

transmitting a plurality of different maximum transmission rates to the software defined network controller via the access state signal.

12. The control method according to claim 11, wherein the maximum transmission rates comprises at least a first maximum transmission rate and a second maximum transmission rate, the first maximum transmission rate being lower than the second maximum transmission rate.

13. The control method according to claim 12, wherein after the at least one network signal forwarder establishes the communication between the baseband processing unit pool and the one remote signal source which transmits the access signal according to the network resource information, the control method further comprises steps of:

after the baseband processing unit pool authenticates the remote signal source which transmits the access signal, the baseband processing unit pool transmitting an authentication notification signal to the access management server; and the access management server informing the software defined network controller according to the authentication notification signal to make the software defined network controller to increase an upper limit of a signal transmission rate between the baseband processing unit pool and the authenticated remote signal source from the first maximum transmission rate to the second maximum transmission rate.

14. The control method according to claim 7, wherein signal transmission between the software defined network controller and the access management server is independent of the at least one network signal forwarder.

* * * * *